Oct. 28, 1924.  
W. A. NORTH  
1,513,062  
METHOD AND MEANS FOR OPERATING MOTORS  
Filed Jan. 25, 1924    2 Sheets-Sheet 2

Inventor  
William A North,

By Carl A. Hellmann.  
Attorney.

Patented Oct. 28, 1924.

1,513,062

UNITED STATES PATENT OFFICE.

WILLIAM A. NORTH, OF MONTCLAIR, NEW JERSEY.

METHOD AND MEANS FOR OPERATING MOTORS.

Application filed January 25, 1924. Serial No. 688,546.

*To all whom it may concern:*

Be it known that I, WILLIAM A. NORTH, a citizen of the United States, residing at Montclair, in the county of Essex and State of New Jersey, have invented certain new and useful Improvements in Methods and Means for Operating Motors, of which the following is a specification.

My invention relates to a method and means for operating a motor while the latter is "submerged," that is, located where it would be subjected to water or other objectionable liquid or gases in the absence of provisions for excluding such undesirable fluid. The term submerged as used in this specification is therefore to be understood as designating such condition. When a motor is placed in a deep well, or a mine, or a vat or tank containing water or corrosive liquids or gases, it is obvious that unless means be provided to prevent access of such objectionable fluid to the electrical and mechanical elements of said motor, the latter will soon be damaged or even totally destroyed. The present invention prevents such damage or destruction by providing a fluid under pressure enveloping the motor and the leads or wires to said motor greater than the pressure of the surrounding objectionable fluid, whereby it becomes impossible for the latter to gain access to the motor. More specifically stated, a bath of oil is provided and maintained under sufficient pressure to protect and lubricate the motor when the latter is at rest, thus protecting it against permeation by the surrounding objectionable fluid. While this affords a sufficient protection to the motor in its condition of rest, it is obvious that in general the presence of said oil bath is highly objectionable when the motor is in operation, as much energy would be wasted in overcoming the liquid friction and producing swirls and eddies in the oil. The invention therefore contemplates also removing the oil from the motor while the latter is in operation, and nevertheless still providing a fluid under adequate pressure enveloping said motor and leads to prevent entry of the objectionable fluid. For this purpose, in general, compressed air is used. It is obvious also that the invention is equally as applicable to generators as to motors, in fact to any apparatus which is located where it would otherwise be exposed to objectionable fluids.

For a fuller understanding of the invention reference is to be had to the accompanying drawings illustrative of one embodiment thereof. In said drawings:

Figs. 3 and 4 show on a larger scale certain valves shown in Fig. 1.

Throughout the drawings, similar reference characters designate corresponding parts.

Figure 1:
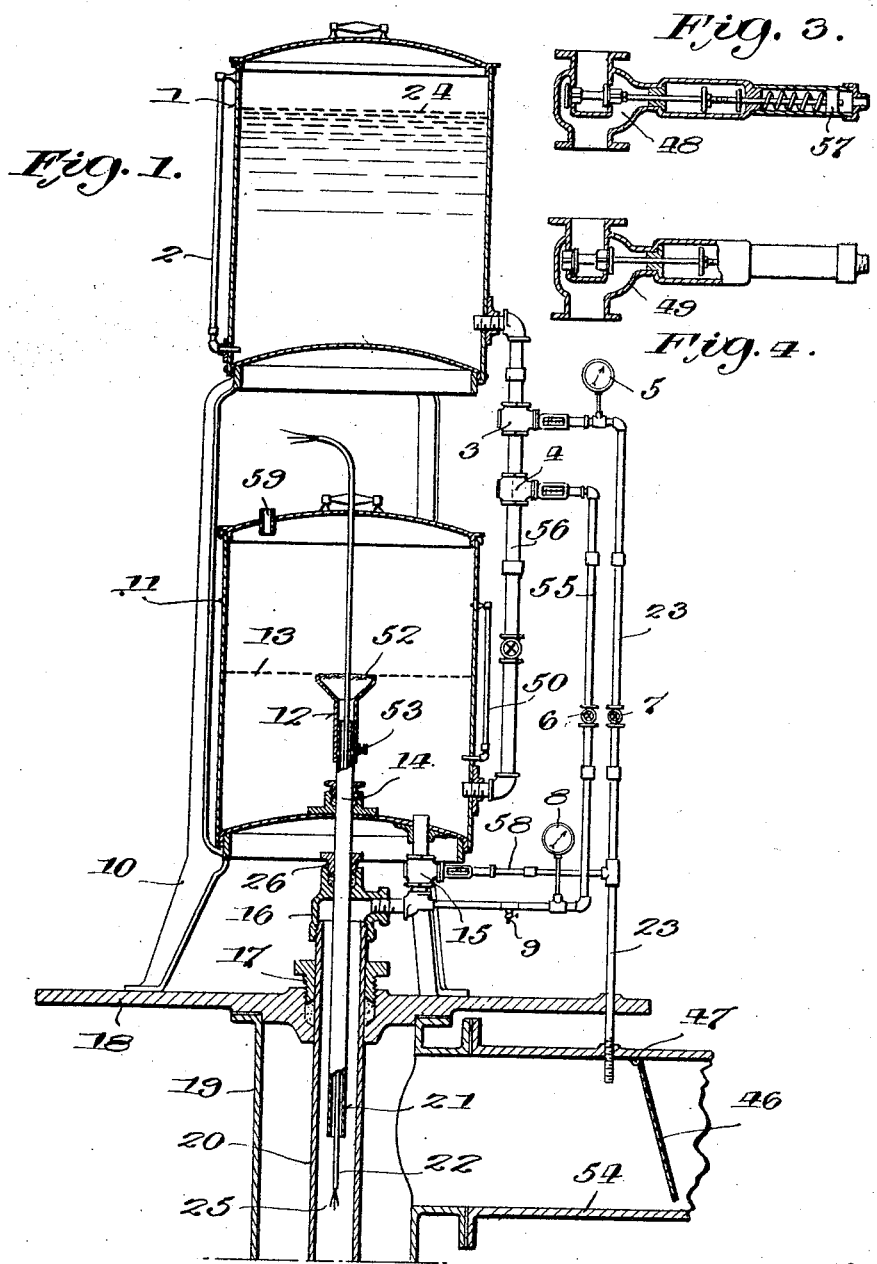
Figure 1 is a diagrammatic view showing part of the device in a partly sectioned elevation.

Referring first to Fig. 1, a reserve oil tank 1 is provided in an elevated position, so that the oil may feed by gravity through the pipe 56 into the operating oil tank 11, shown below tank 1. Both tanks may be supported in any convenient way, as by a stand 10. A gage 2 is provided to cooperate with tank 1 to show the level of the contained oil, and a similar gage 50 is provided for tank 11. Tank 11 has a vent 59, as shown. A pipe 21 leads down from tank 11 as shown and terminates within said tank in an adjustable overflow 12 preferably having a strainer 52. A set screw 53 serves to secure overflow 12 in any desired position, to correspondingly control the level 13 of the oil in tank 11. A stuffing box 14 serves to make a tight joint where the pipe 21 passes through the bottom of tank 11. The pipe 21 is the low pressure oil conduit and leads to the motor compartment which in turn is drained by the intake of the oil pump 34. A pipe 20 surrounding pipe 21 constitutes the high pressure oil conduit and communicates with the discharge or high-pressure side of oil pump 34. This pipe terminates at the fitting 16, here shown as a T and a stuffing box 26 serves to make a tight joint where pipe 21 enters, as shown. An electric cable 22, comprising individual separate conductors 25, also passes through pipe 21, to transmit power to the motor 44, preferably of the polyphase induction type. A water discharge pipe 27 surrounds both of the oil pipes, and terminates at its upper end in a T 19 which connects with the outlet 54. A pipe 23 leads from this outlet 54 to the valve 3 and serves to transmit the water pressure in 54 to the said valve. Valve 3 is a governor valve of the general commercial type shown at 48 in Fig. 3, namely, one wherein a pressure will cause the connected main valve to open. A pipe 55 connects the fitting 16 to another governor valve 4, which is of the general type shown at 49 in Fig. 4, namely one wherein a pressure will cause the connected main valve to close. The conduit 56 which connects tanks 1 and 11 will therefore be open only when there is a pressure acting on the piston 57 of valve 48 and, simultaneously, no pressure on the corresponding piston of valve 49. A water pressure gage 5 of any type may be provided to show the pressure of the water in pipe 23, and is preferably one of the type which gives an alarm for abnormally high or low pressures. Hand valves 6 and 7 are also provided in pipes 55 and 23 as shown, for manual control of said pipes. A gage 8 which may be similar to gage 5 is also provided, in conduit 55 to show the oil pressure therein. A pet cock or drain 9 is located in the lower portion of said conduit as shown. A governor valve 15, which is similar to valve 4 is located in a pipe connecting the fitting 16 to the tank 11 and has its control piston connected to pipe 23 by pipe 58, whereby pressure in pipe 23 will cause valve 15 to control the connection between fitting 16 and tank 11. This valve will have various degrees of opening in order to raise or lower the oil pressure according to variation of water pressure.

A stuffing box 17 secures pipe 20 in base plate 18 as shown. A check valve 46 is pivoted at 47 in the water outlet 54 as shown.

Figure 2:
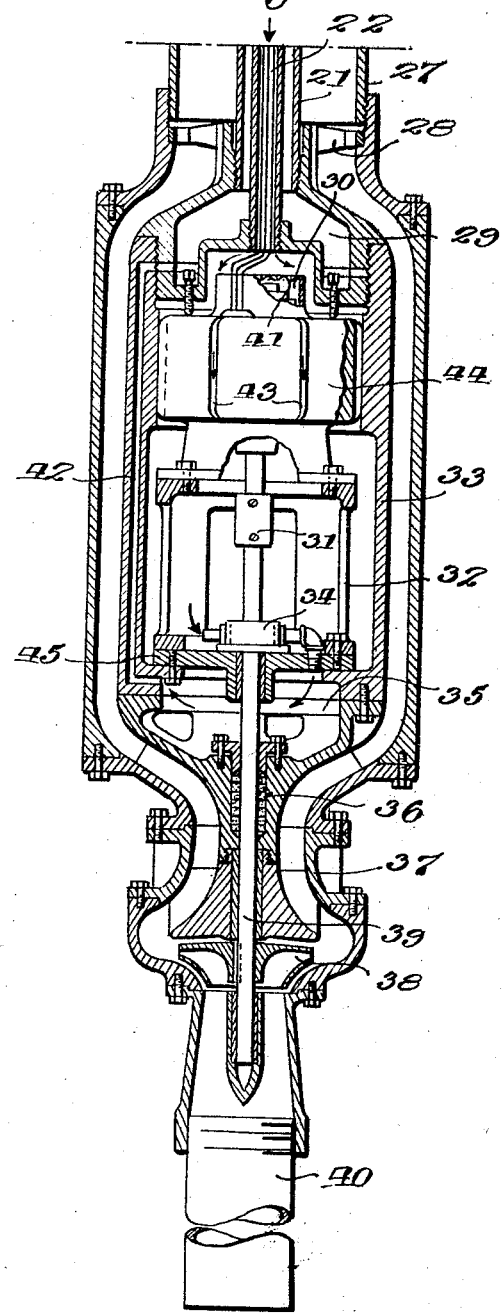
Fig. 2 is a view of a motor and pump cooperating with the organization of elements shown in Fig. 1.

Referring now more particularly to Fig. 2, there is illustrated a motor stand 32 which supports the motor 44, and is itself supported by assembly deck 45. A thrust bearing 30 of any well known type is provided to support the rotor of the motor and a screen 41 covers the bowl of the bearing 30 as shown. Shaft 39 passes through a stuffing box 36 to the pump 37. A coupling 31 in the shaft 39 serves to convey the thrust of the impeller 38 to the bearing 30. The centrifugal pump 37, of which 38 is the impeller has a suction inlet at 40. The motor and motor stand are enclosed in a casing 33. Ducts 42 are provided in the wall of said casing and serve to connect high pressure oil compartments 29 and 35, above and below the motor. Slits or grooves 43 are provided in the motor shell to allow oil and air from the atmosphere to enter the motor casing 33. The operation of the structure herein described is as follows:

Suppose the pump and motor submerged to such depth in the well or mine etc., that, say, thirty-six feet of water stands above the stuffing box 36 and the same elevation of water in the discharge column, as would be the case when the outfit is not operating. Assuming now that the oil has a density of 0.9, then the motor compartment and oil pipes should be filled with oil to such level that the oil pressure would equal the total water pressure. This would require, in the case given, a forty foot column of oil of said density. With such column, the oil pressure at the stuffing box would equal the water pressure, and at any higher point the oil pressure obviously will exceed the water pressure. Such forty foot column of oil would therefore be put into the system at the installation of the unit. Upon starting the unit oil will be drawn down in the motor compartment until the oil pump 34 "breaks suction" and starts to pump air. The oil pipes, compartments, etc. must be of such design that when this occurs the oil has risen in pipe 20 and filled tank 11 to some level such as 13. The adjustable overflow 12 is now set slightly below such level 13 so that oil will overflow and let enough oil down into the motor compartment to make the oil pump build up the proper pressure in pipe 20. After the overflow is once correctly set it is necessary only to allow the automatic valves to act, and to observe gage 2 to maintain a proper reserve of oil in tank 1.

When the unit is stopped, the oil must return from pipe 20 and pass into compartment 35 and thence into compartment 29 and finally into the motor compartment. In order to pass the pump 34 any suitable bypass may be provided, that is, a very small pipe connecting the intake and discharge of said pump. This is not always necessary, as a small hole in deck 45 will serve equally well, and if the pump has any slippage the oil may leak back right through the pump without a by-pass of any kind. When the unit is not running there will of course be no liquid pressure in pipe 23, and valve 3 therefore remains closed, preventing the flow of oil from tank 1. Upon starting the unit however, liquid pressure is transmitted through pipe 23 to valve 3, causing said valve to open, so that this valve now offers no obstruction to the flow of oil from tank 1. However, valve 4 still closes the pipe 56 as long as there is sufficient oil pressure transmitted to said valve 4 through pipe 55, which leads to fitting 16. When such oil pressure drops off however, valve 4 opens, and as valve 3 is open whenever the unit is in operation, pipe 56 is now unobstructed and allows oil to feed from tank 1 to the operating tank 11, until such time when the pressure at fitting 16 builds up, and valve 4 automatically shuts off the reserve oil. Valve 15 is operated by variation in water pressure in line 23 and the various pressures of oil in the high pressure oil system are set up because of various degrees of opening in this valve. This valve makes the oil pressure any amount desired and these oil pressures increase or decrease with corresponding changes in water pressures. Oil continually by-passes through pipe 21 and first fills the bowl of the thrust bearing 30, and then overflows and passes through grooves 43 to the oil pump compartment keeping a constant level somewhere above the intake of said oil pump 34. The motor 44, motor stand 32, oil pump 34 and drive shaft 39 are all intended to be assembled on the deck 45, and then the whole put into the motor chamber and the top sealed. When the unit is stopped, valve 3 instantly closes and the oil which has been standing in the operating tank 11 runs back through valve 15, completely submerging the operating parts of the unit and protecting same against corrosion or rust as well as entrance of water. Thus, the motor runs in air and is free from undue friction, such as would appear if it were submerged in the oil, but is nevertheless automatically submerged in oil as soon as it is put out of action. Should the starting current be objectionably large, during the period while the oil is being pumped away from the motor, a separate small motor could be provided for the sole purpose of operating an oil pump similar to 34, but independent of the main shaft, and this pump need be operated only long enough to remove the oil from the motor compartment, whereupon the main motor is started and pump 34 automatically pumps the oil out. It will be noted that the motor 44 is cooled in three distinct ways, first by contact with oil, second by the air which is circulated through the motor compartment, and third by the indirect action of the water or other liquid outside the shell. All moving parts are constantly and automatically lubricated by the circulated oil under pressure which also serves to insulate the electrical cables and other electrical elements and protect them from contact with moisture. Inasmuch as the internal oil pressure always exceeds the pressure of the external water or other liquid, leakage into the oil conduits is impossible and the only leakage that could take place would be leakage of the oil out of its conduit. This would be very little because the oil pressure is kept just a very little greater than the water pressures. If by accident or by condensation from the air any water should get into the oil, trouble from this cause can be avoided by periodic renewal of the oil.

While I have described a specific embodiment of my invention wherein an electric motor drives a pump, it is obvious that the motor need not be electric, but depend upon steam, compressed air, or other motive power, and that the device driven by the motor may be other than a pump. It is also clear that the invention is applicable to generators as well as motors, and the term motor in the claims is therefore to be considered broad enough to include generators.

Having disclosed my invention in the preferred form, I claim:

1. A process of operating a motor which comprises submerging said motor in a lubricant whenever the latter is inactive, and removing and keeping away most of said lubricant from the motor upon, and by operation of, the motor.

2. In a lubricating system comprising a reservoir for oil, a conduit leading from said reservoir to the machine to be lubricated, and an oil pump operated by said machine for forcing the oil back to the reservoir, means including said oil pump whereby most of the oil is removed and kept away from the immediate vicinity of the machine while the latter is in operation, but is automatically returned upon putting the machine out of operation.

3. A lubricating system for a machine operating while surrounded by an injurious medium, which comprises an enclosure for the machine and automatic means for feeding lubricant to the machine enclosure under pressures at all points exceeding the corresponding pressures of the external medium, whereby leakage of the injurious medium into the enclosure is rendered impossible, together with means automatically removing and keeping away most of the lubricant from the immediate vicinity of the machine only during operation of said machine.

4. A system as described in claim 2, having a reserve tank for oil and automatic means for drawing oil therefrom and introducing it into the system whenever the level of oil in the machine falls below that desired.

5. A lubricating system comprising a machine to be lubricated, an enclosure for same, means cooperating with said machine to remove most of the lubricant from the immediate vicinity of the latter when the machine is in operation, said means including automatic governor valves which control the supply of lubricant in response to the pressure set up by the lubricant removing means.

In testimony whereof I affix my signature.

WILLIAM A. NORTH.